(12) United States Patent
Yang et al.

(10) Patent No.: US 11,449,955 B2
(45) Date of Patent: Sep. 20, 2022

(54) INFORMATION PROCESSING METHOD AND APPARATUS

(71) Applicant: Tencent Technology (Shenzhen) Company Limited, Shenzhen (CN)

(72) Inventors: Liu Yang, Shenzhen (CN); Li Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 288 days.

(21) Appl. No.: 16/017,780

(22) Filed: Jun. 25, 2018

(65) Prior Publication Data

US 2018/0308182 A1 Oct. 25, 2018

Related U.S. Application Data

(63) Continuation-in-part of application No. PCT/CN2017/072251, filed on Jan. 23, 2017.

(30) Foreign Application Priority Data

Feb. 5, 2016 (CN) .......................... 201610081933.7

(51) Int. Cl.
*G06Q 30/06* (2012.01)
*G06Q 50/00* (2012.01)
(Continued)

(52) U.S. Cl.
CPC ......... *G06Q 50/01* (2013.01); *G06F 16/9535* (2019.01); *G06F 16/9566* (2019.01);
(Continued)

(58) Field of Classification Search
CPC ....................................... G06Q 30/0601–0645
(Continued)

(56) References Cited

U.S. PATENT DOCUMENTS

| | | | |
|---|---|---|---|
| 10,068,257 B1* | 9/2018 | Mosthaf | G06Q 30/0269 |
| 2005/0033615 A1* | 2/2005 | Nguyen | G06Q 10/1095 |
| | | | 705/5 |

(Continued)

FOREIGN PATENT DOCUMENTS

| | | |
|---|---|---|
| CN | 101771532 A | 7/2010 |
| CN | 104660487 A | 5/2015 |
| CN | 105787776 A | 7/2016 |

OTHER PUBLICATIONS

Zhang, Mu, Dan Yao, and Qian Zhou. "The application and design of QR code in scenic spot's eTicketing system—a case study of Shenzhen Happy Valley." International Journal of Science and Technology 2.12 (2012): 817-822.*

(Continued)

*Primary Examiner* — Resha Desai
(74) *Attorney, Agent, or Firm* — Morgan, Lewis & Bockius LLP

(57) ABSTRACT

The present disclosure discloses an information processing method performed at a computer server that is communicatively connected to a plurality of mobile terminals. The computer server receives a sharing request sent by a first terminal, where the sharing request carries a page link used to be linked to an information presentation page and an identifier of a first user currently logging into. The computer server then generates, according to the page link and the first user identifier, a sharing link used to be linked to the information presentation page and sends the sharing link to a second terminal of a second user identifier in a user relation chain of the first user identifier. Next, the computer server allocates virtual goods to the first user identifier according to a preset policy when it is determined that the second mobile terminal displays the information presentation page according to the sharing link.

17 Claims, 9 Drawing Sheets

(51) Int. Cl.
*G06F 16/955* (2019.01)
*G06F 16/9535* (2019.01)
*G06Q 10/02* (2012.01)

(52) U.S. Cl.
CPC ......... *G06Q 30/0635* (2013.01); *G06Q 10/02* (2013.01); *G06Q 30/0641* (2013.01)

(58) Field of Classification Search
USPC ............................................ 705/26.1–27.2
See application file for complete search history.

(56) References Cited

U.S. PATENT DOCUMENTS

| | | | |
|---|---|---|---|
| 2011/0258326 A1* | 10/2011 | Hu | H04L 63/062 709/226 |
| 2014/0222834 A1 | 8/2014 | Parikh et al. | |
| 2015/0088769 A1* | 3/2015 | Saarinen | H04L 67/22 705/317 |
| 2016/0148123 A1* | 5/2016 | Paleja | G06K 19/06037 705/5 |
| 2016/0234659 A1* | 8/2016 | Luo | H04W 4/08 |

OTHER PUBLICATIONS

Tencent Technology, ISRWO, PCT/CN2017/072251, May 3, 2017, 7 pgs.
Tencent Technology, IPRP, PCT/CN2017/072251, Aug. 7, 2018, 6 pgs.

* cited by examiner

INFORMATION PROCESSING METHOD AND APPARATUS

RELATED APPLICATIONS

This application is a continuation-in-part application of PCT/CN2017/072251, entitled "INFORMATION PROCESSING METHOD AND APPARATUS" filed on Jan. 23, 2017, which claims priority to Chinese Patent Application No. 201610081933.7, filed with the State Intellectual Property Office of the People's Republic of China on Feb. 5, 2016, and entitled "INFORMATION PROCESSING METHOD AND APPARATUS," all of which are incorporated by reference in their entirety.

FIELD OF THE TECHNOLOGY

The present disclosure relates to the field of network technologies, and in particular, to an information processing method and apparatus.

BACKGROUND OF THE DISCLOSURE

In daily life, users usually share much information with friends. Using a program such as a film and a concert as an example, before watching the program, a user may search for a program-related ticket website, search the ticket website for the program that the user wishes to watch, click to enter an information presentation page of the program, and make a payment on the information presentation page, so as to complete a ticket purchase process. After the user successfully purchases a ticket online, the user can enter the performance venue with the ticket to watch the program. After watching the program, the user can share ideas about the program with friends.

However, when the user wants to share the ideas with the friends, the user can share the ideas with the friends only by making a phone call or sending a short messaging service message, the operation is inconvenient, and the interactivity is poor. In addition, after the user shares the ideas with the friends, if they also want to watch the program, they need to perform the foregoing online ticket purchase process again. As a result, the operation is inconvenient, leading to a very low recommendation conversion rate.

SUMMARY

To resolve the problem in the existing technology, exemplary embodiments of the present disclosure provide an information processing method and apparatus. The technical solutions are as follows:

A first aspect provides an information processing method performed at a computer server having one or more processors and memory storing instructions to be executed by the one or more processors that is communicatively connected to a plurality of mobile terminals communicating with the computer server, the method including:

receiving a sharing request sent by a first mobile terminal of the plurality of mobile terminals, the sharing request carrying at least a page link used to be linked to an information presentation page and an identifier of a first user currently logging into the first mobile terminal, and the sharing request being generated under triggering by the first mobile terminal when the first mobile terminal detects a sharing operation on the information presentation page;

generating a sharing link according to the page link and the first user identifier, the sharing link being used to be linked to the information presentation page;

sending, based on a user relation chain of the first user identifier, the sharing link to at least a second mobile terminal of the plurality of mobile terminals of a second user identifier in the user relation chain; and allocating virtual goods to the first user identifier in the sharing link according to a preset policy when it is determined that the second mobile terminal displays the information presentation page according to the sharing link.

A second aspect provides a computer server that is communicatively connected to a plurality of mobile terminals, including one or more processors; memory; and a plurality of instructions stored in the memory that, when executed by the one or more processors, cause the computer server to perform the aforementioned method.

A third aspect provides a non-transitory computer readable storage medium storing a plurality of instructions configured for execution by one or more processors of a computer server, the plurality of instructions, when executed by the one or more processors, causing the computer server to perform the aforementioned method.

The technical solutions provided in the embodiments of the present disclosure bring about the following beneficial effects:

In the method and apparatus provided in the embodiments of the present disclosure, the sharing link carrying the page link of the information presentation page and the first user identifier is generated according to the sharing request sent by the first mobile terminal, and is sent to the second mobile terminal of the at least one second user identifier in the user relation chain of the first user identifier, and the virtual goods is allocated to the first user identifier when it is determined that any second terminal displays the information presentation page according to the sharing link. A user can share an information presentation page with another user by sending a sharing link, and virtual goods can be allocated to the user when the another user accepts sharing of the user. Therefore, operation is convenient, interactivity is enhanced, and user viscosity is improved. The another user can view the information presentation page only by clicking the sharing link, so that the operation is relatively convenient, and the recommendation conversion rate is increased.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative effects shall fall within the protection scope of the present disclosure.

Figure 1:
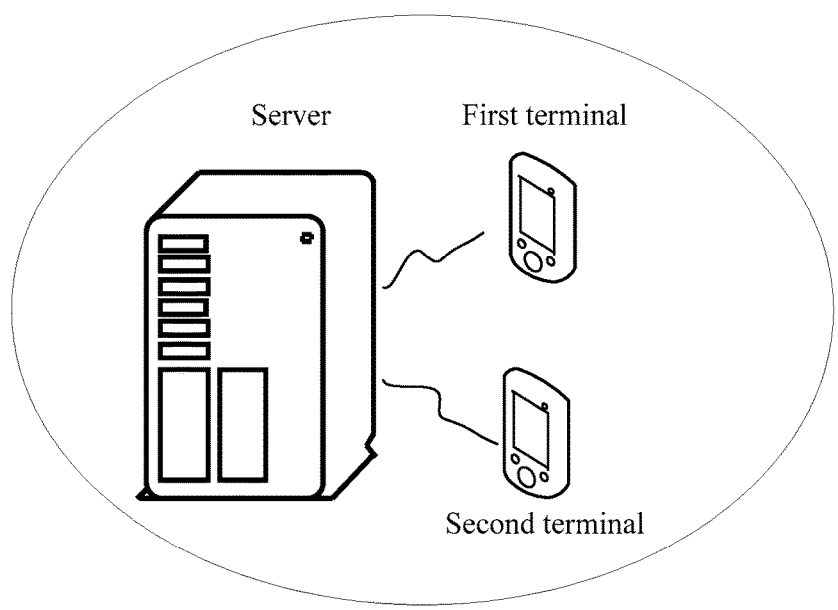
FIG. 1 is a schematic structural diagram of an information processing system according to an embodiment of the present disclosure.

FIG. 1 is a schematic structural diagram of an information processing system according to an embodiment of the present disclosure. Referring to FIG. 1, the information processing system includes: a first terminal, a server, and a second terminal. The first terminal logs onto the server based on a first user identifier, and the first mobile terminal is connected to the server via a network. The second terminal logs onto the server based on a second user identifier, and the second mobile terminal is connected to the server via a network.

The first terminal is configured to display an information presentation page, and send a sharing request to the server if a sharing operation on the information presentation page is detected.

The server is configured to receive the sharing request sent by the first mobile terminal, generate, according to a page link and the first user identifier that are carried in the sharing request, a sharing link used to be linked to the information presentation page, and send, based on a user relation chain of the first user identifier, the sharing link to a second terminal of at least one second user identifier in the user relation chain.

The second terminal is configured to display the sharing link, and display the information presentation page according to the sharing link when a click operation on the sharing link is detected.

The server is configured to allocate virtual goods to the first user identifier in the sharing link according to a preset policy when it is determined that the second mobile terminal displays the information presentation page according to the sharing link.

The first user identifier corresponds to the second user identifier. The second user identifier may be each user identifier included in the user relation chain of the first user identifier, that is, each friend of the first user identifier. Alternatively, the second user identifier is a receiver identifier that is designated by the first mobile terminal for the sharing link according to the user relation chain of the first user identifier. This is not limited in this embodiment of the present disclosure.

In this embodiment of the present disclosure, the server provides an information presentation page for a user, and the user can access the server and view the information presentation page, and can further complete a designated operation such as a ticket purchase operation and a commenting operation on the information presentation page. The server may further provide a social function, maintain a user relation chain of each user identifier, generate a sharing link according to the sharing request of the first user identifier, and send, based on the user relation chain of the first user identifier, the sharing link to the second mobile terminal of the at least one second user identifier in the user relation chain, so that any second terminal can display the sharing link. The server may further provide a virtual goods management function, allocate virtual goods to a user identifier according to a preset policy, and manage and maintain the virtual goods of each user identifier.

The server may be a server integrating an information presentation module, a social function module, and a virtual goods management module. For example, the server may be a social application server, an instant messaging server, or the like. Alternatively, the server may further include multiple different servers in a same server cluster, for example, an information presentation server, a social application server, and a virtual goods management server. This is not limited in this embodiment of the present disclosure.

Figure 2:
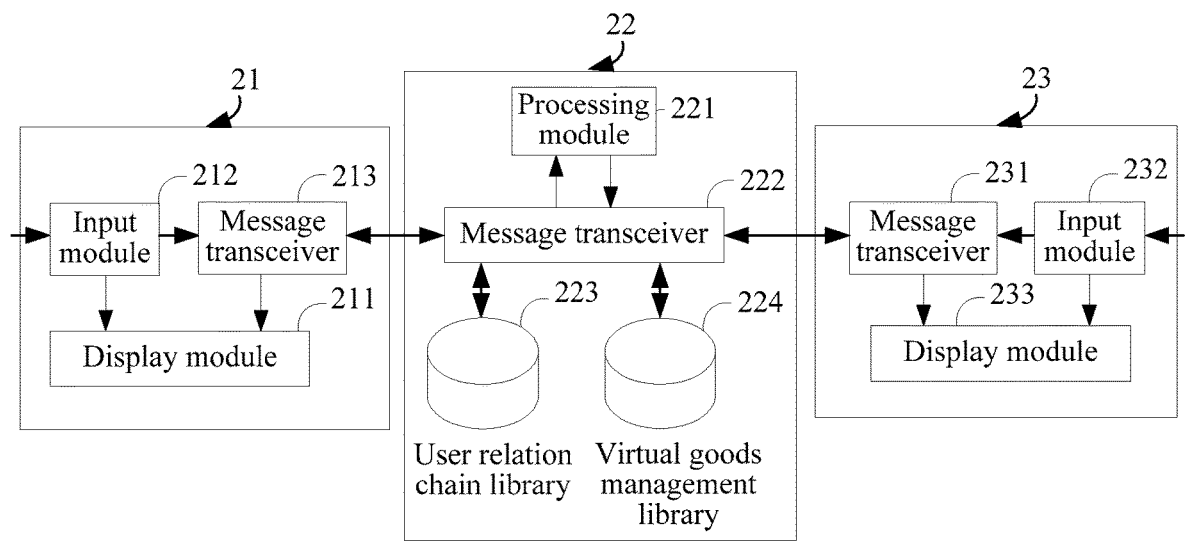
FIG. 2 is a schematic composition diagram of an information processing system according to an embodiment of the present disclosure.

FIG. 2 is a schematic composition diagram of an information processing system according to an embodiment of the present disclosure. Referring to FIG. 2, the following describes composition parts of the interaction system.

1. The first terminal 21 includes a display module 211, an input module 212, and a message transceiver 213.

The display module 211 is configured to display an information presentation page, a message aggregation page, and the like, and is further configured to obtain a designated instruction operation, a sharing operation, and the like of the first mobile terminal 21 on the information presentation page. The input module 212 is configured to obtain a key press operation, a touch screen operation, a sliding operation, or the like of a user on the first mobile terminal 21, and the user can enter searching information, comment information, and the like on the information presentation page by using the input module 212. The message transceiver 213 is configured to send a sharing request to a server 22.

2. The server 22 includes a processing module 221, a message transceiver 222, a user relation chain database 223, and a virtual goods management database 224.

The user relation chain database 223 is configured to store a user relation chain of each user. The virtual goods management database 234 is configured to store virtual goods of each user identifier.

The message transceiver 222 is configured to receive the sharing request sent by the first mobile terminal 21, the processing module 221 is configured to generate a sharing link according to a page link and a first user identifier that are carried in the sharing request sent by the first mobile terminal 21, and the message transceiver 222 is further configured to send the sharing link to any second terminal 23. The message transceiver 222 is further configured to receive a designated operation request sent by the second mobile terminal 23, and the processing module 221 is further configured to process the designated operation request. In addition, the processing module 221 is further configured to allocate virtual goods to a user identifier according to a preset policy, and update the virtual goods management database 224.

3. The second terminal 23 includes a message transceiver 231, an input module 232, and a display module 233.

The message transceiver 231 is configured to receive a sharing link that is pushed by the server 22 according to an identifier of a logon user, and is further configured to send a designated operation request to the server 22. The input module 232 is configured to obtain a key press operation, a touch screen operation, a sliding operation, or the like of a user on the second mobile terminal 23, and the user can enter searching information, comment information, and the like on the information presentation page by using the input module 232. The display module 233 is configured to display the sharing link, obtain a click operation on the sharing link, display the information presentation page, and obtain a designated instruction operation on the information presentation page.

Figure 3:
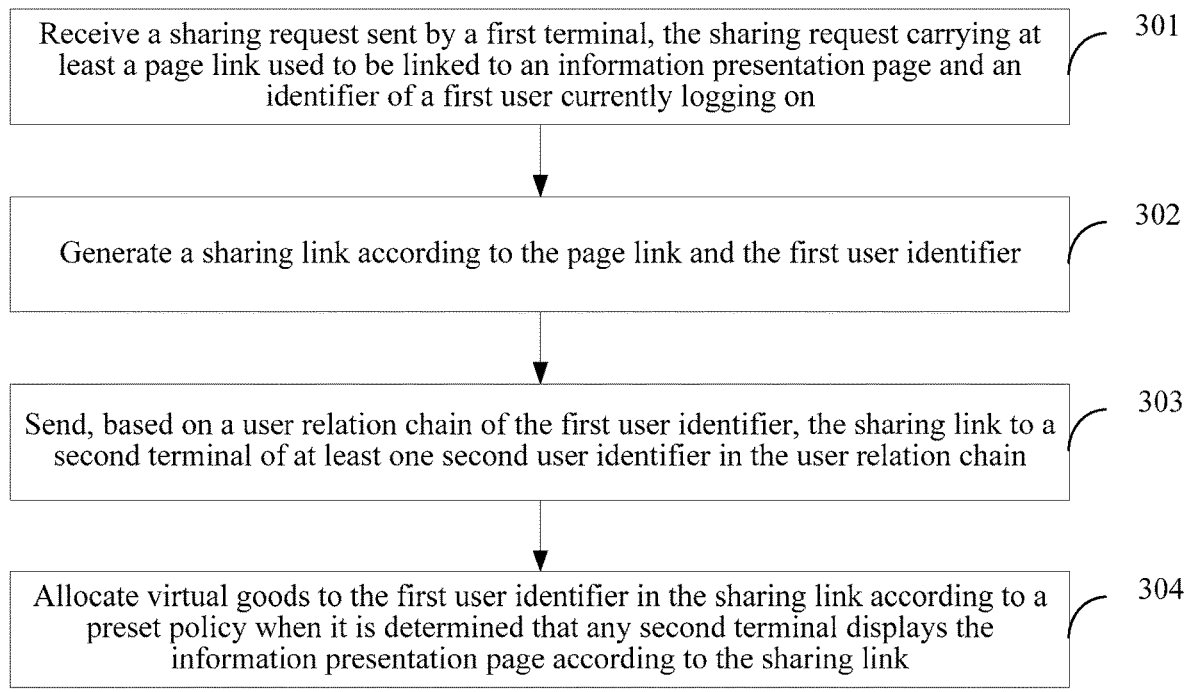
FIG. 3 is a flowchart of an information processing method according to an embodiment of the present disclosure.

FIG. 3 is a flowchart of an information processing method according to an embodiment of the present disclosure. This embodiment of the present disclosure is performed by a server. Referring to FIG. 3, the method includes:

301. Receive a sharing request sent by a first terminal, the sharing request carrying at least a page link used to be linked to an information presentation page and an identifier of a first user currently logging on, and the sharing request being generated under triggering by the first mobile terminal when the first mobile terminal detects a sharing operation on the information presentation page.

302. Generate a sharing link according to the page link and the first user identifier, the sharing link being used to be linked to the information presentation page.

303. Send, based on a user relation chain of the first user identifier, the sharing link to a second terminal of at least one second user identifier in the user relation chain.

304. Allocate virtual goods to the first user identifier in the sharing link according to a preset policy when it is determined that any second terminal displays the information presentation page according to the sharing link.

In the method provided in this embodiment of the present disclosure, the sharing link carrying the page link of the information presentation page and the first user identifier is generated according to the sharing request sent by the first mobile terminal, and is sent to the second mobile terminal of the at least one second user identifier in the user relation chain of the first user identifier, and the virtual goods is allocated to the first user identifier when it is determined that any second terminal displays the information presentation page according to the sharing link. A user can share an information presentation page with another user by sending a sharing link, and the server can allocate virtual goods to the user when the another user accepts sharing of the user. Therefore, operation is convenient, interactivity is enhanced, and user viscosity is improved. The another user can view the information presentation page only by clicking the sharing link, so that the operation is relatively convenient, and the recommendation conversion rate is increased.

In some embodiments, the allocating virtual goods to the first user identifier in the sharing link according to a preset policy when it is determined that any second terminal displays the information presentation page according to the sharing link includes:

allocating the virtual goods to the first user identifier in the sharing link according to the preset policy when it is determined that any second terminal displays the information presentation page according to the sharing link and completes a designated operation on the information presentation page.

In some embodiments, the designated operation includes at least one of a ticket purchase operation and a commenting operation.

In some embodiments, the information presentation page is an information presentation page of a program, and before the allocating the virtual goods to the first user identifier in the sharing link according to the preset policy when it is determined that any second terminal displays the information presentation page according to the sharing link and completes a designated operation on the information presentation page, the method further includes:

allocating, when a ticket purchase request sent by any second terminal is received and the ticket purchase request carries the sharing link and a second user identifier corresponding to the second mobile terminal, a virtual ticket of the program to the second user identifier corresponding to the second mobile terminal, and determining that the second mobile terminal completes a ticket purchase operation for the program according to the sharing link; or publishing, when a commenting request sent by any second terminal is received and the commenting request carries the sharing link, a second user identifier corresponding to the second mobile terminal, and to-be-published comment information, the comment information on the information presentation page, and determining that the second mobile terminal completes a commenting operation for the program according to the sharing link.

In some embodiments, the allocating the virtual goods to the first user identifier in the sharing link according to the preset policy includes at least one of the following operations:

adding a numerical value to an account of the first user identifier;

adding a virtual ticket to a virtual goods library of the first user identifier;

adding a virtual red envelop to the virtual goods library of the first user identifier; and adding a virtual prop to the virtual goods library of the first user identifier.

In some embodiments, before the receiving a sharing request sent by a first terminal, the method further includes:

providing an entry of the designated operation on the information presentation page, so that the first mobile terminal completes the designated operation according to the entry of the designated operation when the first mobile terminal displays the information presentation page; and providing a sharing entry for the first mobile terminal when it is determined that the first mobile terminal completes the designated operation, where the sharing entry is used to trigger the sharing operation.

In some embodiments, the method further includes:

receiving an access request sent by any second terminal, where the access request carries the sharing link; and identifying the page link according to the sharing link, and sending the information presentation page to the second mobile terminal according to the page link, so that the second mobile terminal displays the information presentation page.

In some embodiments, the sending, based on a user relation chain of the first user identifier, the sharing link to a second terminal of at least one second user identifier in the user relation chain includes:

determining each second user identifier included in the user relation chain of the first user identifier; and sending the sharing link to a second terminal of each second user identifier, so that the second mobile terminal of each second user identifier displays the sharing link on a message aggregation page.

In some embodiments, the sending, based on a user relation chain of the first user identifier, the sharing link to a second terminal of at least one second user identifier in the user relation chain includes:

obtaining a receiver identifier that is designated by the first mobile terminal for the sharing link according to the user relation chain of the first user identifier, and using the receiver identifier as a second user identifier; and sending the sharing link to a second terminal of the second user identifier, so that the second mobile terminal displays the sharing link on a message receiving page.

All exemplary technical solutions above may be combined in any manner to form exemplary embodiments of the present disclosure. Details are not described herein.

Figure 4:
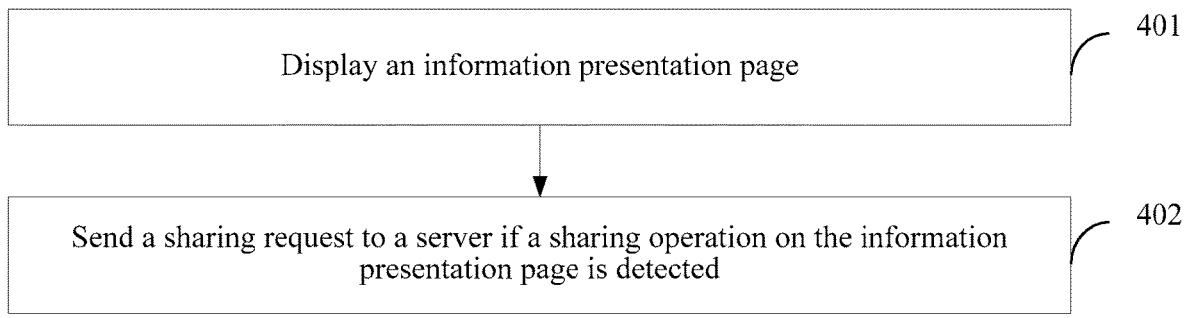
FIG. 4 is a flowchart of an information processing method according to an embodiment of the present disclosure.

FIG. 4 is a flowchart of an information processing method according to an embodiment of the present disclosure. This embodiment of the present disclosure is performed by a terminal. In order that a person skilled in the art understands the present disclosure more clearly, the terminal herein corresponds to the first mobile terminal in FIG. 2. Referring to FIG. 4, the method includes:

401. Display an information presentation page.

402. Send a sharing request to a server if a sharing operation on the information presentation page is detected, the sharing request carrying at least a page link used to be linked to the information presentation page and an identifier of a first user currently logging on.

The server is configured to generate, according to the page link and the first user identifier, a sharing link used to be linked to the information presentation page, send, based on a user relation chain of the first user identifier, the sharing link to a second terminal of at least one second user identifier in the user relation chain, and allocate virtual goods to the first user identifier in the sharing link according to a preset policy when it is determined that any second terminal displays the information presentation page according to the sharing link.

In the method provided in this embodiment of the present disclosure, the sharing request is sent to the server according to a detected sharing operation when the information presentation page is displayed, so that the server generates the sharing link carrying the page link of the information presentation page and the first user identifier, sends the sharing link to the second mobile terminal of the at least one second user identifier in the user relation chain of the first user identifier, and allocates the virtual goods to the first user identifier when it is determined that any second terminal displays the information presentation page according to the sharing link. A user can share an information presentation page with another user by sending a sharing link, and virtual goods can be allocated to the user when the another user accepts sharing of the user. Therefore, operation is convenient, interactivity is enhanced, and user viscosity is improved. The another user can view the information presentation page only by clicking the sharing link, so that the operation is relatively convenient, and the recommendation conversion rate is increased.

In some embodiments, the sending a sharing request to a server if a sharing operation on the information presentation page is detected includes:

sending the sharing request to the server if the sharing operation is detected after a designated operation is completed on the information presentation page.

In some embodiments, the designated operation includes at least one of a ticket purchase operation and a commenting operation.

In some embodiments, the information presentation page is an information presentation page of a program, and the sending a sharing request to a server if a sharing operation on the information presentation page is detected includes:

sending a ticket purchase request to the server when a ticket purchase instruction operation for the program on the information presentation page is detected, so that the server allocates a virtual ticket of the program to the first user identifier; and sending the sharing request to the server if the sharing operation on the information presentation page is detected after a ticket purchase success message returned by the server is received.

In some embodiments, the information presentation page is an information presentation page of a program, and the sending a sharing request to a server if a sharing operation on the information presentation page is detected includes:

obtaining entered comment information when a comment instruction operation for the program on the information presentation page is detected, and sending a commenting request to the server, where the commenting request carries at least the comment information, so that the server publishes the comment information on the information presentation page; and sending the sharing request to the server if the sharing operation on the information presentation page is detected after a comment success message returned by the server is received.

In some embodiments, the method further includes:

displaying an entry of the designated operation on the information presentation page when the information presentation page is displayed, where the entry of the designated operation is used to trigger the designated operation; and displaying, on the information presentation page after the designated operation is completed according to the entry of the designated operation, a sharing entry provided by the server, where the sharing entry is used to trigger the sharing operation.

In some embodiments, before the sending a sharing request to a server, the method further includes:

obtaining a designated receiver identifier from the user relation chain of the first user identifier, where correspondingly, the sharing request further carries the receiver identifier.

In some embodiments, the method further includes:

displaying a message aggregation page after the sharing request is sent to the server; or displaying a message aggregation page when an activation operation on a message entry is detected, where the message aggregation page is used to aggregate a message that is pushed by the server to the first mobile terminal according to the first user identifier.

All exemplary technical solutions above may be combined in any manner to form exemplary embodiments of the present disclosure. Details are not described herein.

Figure 5:
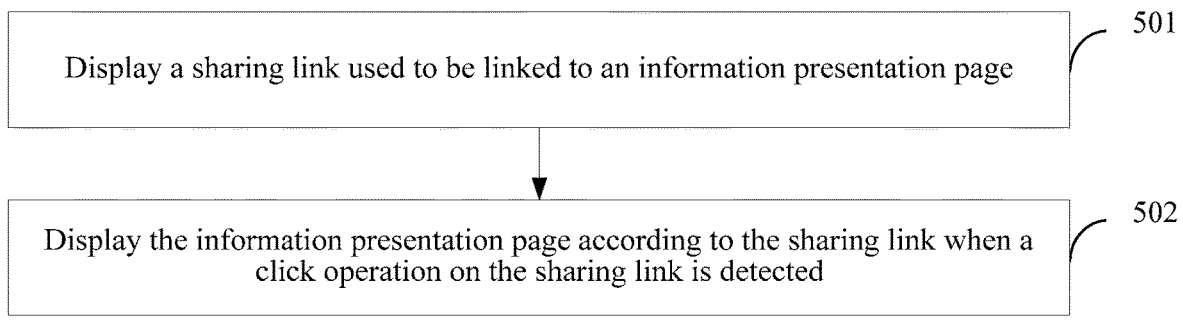
FIG. 5 is a flowchart of an information processing method according to an embodiment of the present disclosure.

FIG. 5 is a flowchart of an information processing method according to an embodiment of the present disclosure. This embodiment of the present disclosure is performed by a terminal. In order that a person skilled in the art understands the present disclosure more clearly, the terminal herein corresponds to the second mobile terminal in FIG. 2. Referring to FIG. 5, the method includes:

501. Display a sharing link used to be linked to an information presentation page, the sharing link being generated by a server, after the server receives a sharing request that is generated by a first terminal when the first mobile terminal detects a sharing operation on the information presentation page, according to a page link used to be linked to the information presentation page and an identifier of a first user currently logging onto the first mobile terminal.

502. Display the information presentation page according to the sharing link when a click operation on the sharing link is detected, so that the server displays the information presentation page according to the sharing link, and allocates virtual goods to the first user identifier in the sharing link according to a preset policy.

In the method provided in this embodiment of the present disclosure, the sharing link used to be linked to the information presentation page is displayed, and the virtual goods is allocated to the first user identifier in the sharing link when it is determined that the information presentation page is displayed according to the sharing link. A sharing link shared by another user is displayed, so that it can be ensured that the information presentation page can be displayed only by clicking the sharing link by the user. Therefore, the operation is convenient, and the recommendation conversion rate is increased. In addition, when the user displays the information presentation page according to the sharing link, virtual goods is allocated to the user sending the sharing link, so that interactivity is enhanced, and user viscosity is improved.

In some embodiments, after the displaying the information presentation page according to the sharing link when a click operation on the sharing link is detected, the method further includes:

sending a designated operation request to the server if a designated instruction operation on the information presentation page is detected, where the designated operation request carries the sharing link and an identifier of a second user currently logging on, so that the server displays the information presentation page according to the sharing link, and allocates the virtual goods to the first user identifier in the sharing link according to a preset policy when a designated operation is completed on the information presentation page.

In some embodiments, the information presentation page is an information presentation page of a program, and the sending a designated operation request to the server if a designated instruction operation on the information presentation page is detected includes:

sending a ticket purchase request to the server if a ticket purchase instruction operation for the program on the information presentation page is detected, where the ticket purchase request carries the sharing link and the second user identifier, so that the server allocates a virtual ticket of the program to the second user identifier, and allocates the virtual goods to the first user identifier according to the preset policy, when it is determined that the information presentation page is displayed according to the sharing link and a ticket purchase operation for the program is completed on the information presentation page.

In some embodiments, the information presentation page is an information presentation page of a program, and the sending a designated operation request to the server if a designated instruction operation on the information presentation page is detected includes:

obtaining entered comment information if a comment instruction operation for the program on the information presentation page is detected, and sending a commenting request to the server, where the commenting request carries at least the comment information and the identifier of the second user currently logging on, so that the server publishes the comment information on the information presentation page, and allocates the virtual goods to the first user identifier according to a preset policy when it is determined that the information presentation page is displayed according to the sharing link and a commenting operation for the program is completed on the information presentation page.

In some embodiments, the displaying the information presentation page according to the sharing link when a click operation on the sharing link is detected includes:

sending an access request to the server when a click operation on the sharing link is detected, where the access request carries the sharing link, so that the server identifies the page link according to the sharing link, and returns the information presentation page according to the page link; and displaying the information presentation page returned by the server.

In some embodiments, the method further includes:

displaying an entry of the designated operation on the information presentation page when the information presentation page is displayed according to the sharing link, where the entry of the designated operation is used to trigger the designated operation.

In some embodiments, the displaying a sharing link used to be linked to an information presentation page includes:

aggregating, on a message aggregation page, a message pushed by the server; and displaying the message aggregation page when an activation operation on a message entry is detected, and displaying the sharing link on the message aggregation page.

In some embodiments, the displaying a sharing link used to be linked to an information presentation page includes:

displaying the sharing link on a message receiving page corresponding to the first user identifier.

All exemplary technical solutions above may be combined in any manner to form exemplary embodiments of the present disclosure. Details are not described herein.

Figure 6A:
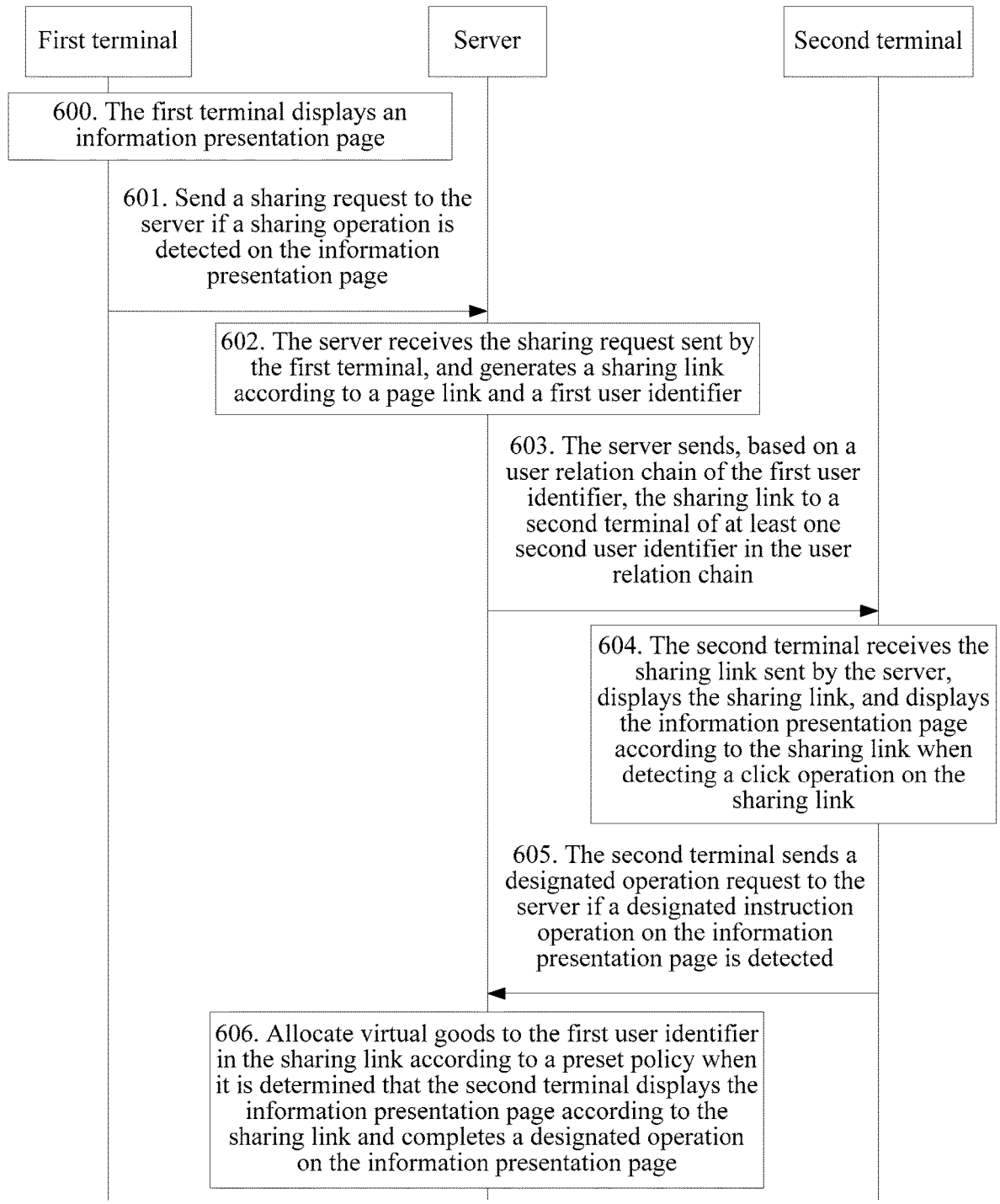
FIG. 6A is a flowchart of an information processing method according to an embodiment of the present disclosure.

FIG. 6A is a flowchart of an information processing method according to an embodiment of the present disclosure. Interaction bodies of this embodiment of the present disclosure are a first terminal, a second terminal, and a server. Referring to FIG. 6, the method includes:

600. The first terminal displays an information presentation page.

601. Send a sharing request to a server when a sharing operation is detected on the information presentation page.

The information presentation page is used to present various information. For example, the information presentation page may be an information presentation page of a program, an information presentation page of a commodity, or a message presentation page. This is not limited in this embodiment of the present disclosure.

The information presentation page of the program may include detailed information of the program, for example, introduction information and comment information of the program. The introduction information may include information such as a ticket price, a performance site, and performance time. This is not limited in this embodiment of the present disclosure. The program may be an online program, for example, a film or a television play on a video website, or may be an offline program, for example, a game, a concert, a theatrical film, or the like. This is not limited in this embodiment of the present disclosure.

In an actual application, the first mobile terminal may display the information presentation page in multiple manners. For example, using an example in which the information presentation page is an information presentation page of a program, the first mobile terminal may search a program-related website, and search the website for a page link corresponding to a program that a user wishes to watch. The page link is used to be linked to an information presentation page of the program, and the first mobile terminal may display the information presentation page of the program according to the page link. Alternatively, the first mobile terminal may follow a program-related public identifier in advance by scanning a two-dimensional barcode, searching for the public identifier, or the like, and when the public identifier publishes a new program, a corresponding page link may be pushed to the first mobile terminal, and the first mobile terminal can display an information presentation page of the program according to the page link. Alternatively, the page link may be sent to the first mobile terminal by another terminal, and the first mobile terminal displays an information presentation page of the program according to the page link. This embodiment of the present disclosure does not limit a manner in which the first mobile terminal displays the information presentation page.

After the first mobile terminal displays the information presentation page, if a user wants to share the information presentation page with another user, the user may trigger a sharing operation on the information presentation page, and the first mobile terminal can send a sharing request to the server after detecting the sharing operation of the user. The sharing request carries the page link used to be linked to the information presentation page and an identifier of a first user currently logging onto the first mobile terminal, and the first user identifier may be a user account, a user name, or the like of the first mobile terminal. This is not limited in this embodiment of the present disclosure.

When the user triggers the sharing operation, the user may designate a receiver identifier. The first terminal may obtain the designated receiver identifier from a user relation chain of the identifier of the first user that logs on. Correspondingly, the sharing request further carries the receiver identifier, to represent that the information presentation page is shared with the receiver identifier, but is not shared with other user identifiers. When the sharing request does not include the designated receiver identifier, it represents that the information presentation page is shared with all user identifiers in the user relation chain of the first user identifier by default. For example, the information presentation page is shared with all friends of the user.

In addition, the user may further complete a designated operation on the information presentation page. For example, the designated operation may be a ticket purchase operation, a shopping operation, a commenting operation, or the like. This is not limited in this embodiment of the present disclosure. In an actual application, the user may further trigger the sharing operation after completing the designated operation on the information presentation page. This is not limited in this embodiment of the present disclosure.

For example, using an example in which the information presentation page is an information presentation page of a program, when the first mobile terminal displays the information presentation page of the program, the user may complete a designated operation on the information presentation page. The designated operation may include a ticket purchase operation, a commenting operation, or the like. This is not limited in this embodiment of the present disclosure. After the first mobile terminal completes the designated operation, if the user wants to recommend the program to another user, and guide the another user in performing a designated operation for the program, the user may trigger the sharing operation, and the first mobile terminal may send the sharing request to the server after detecting the sharing operation of the user, so as to recommend the program to the another user.

For different types of designated operations, processes in which the first mobile terminal completes the designated operations are different, and sharing requests sent to the server are also different. That is, using an example in which the information presentation page is the information presentation page of the program, step 601 may further include at least one of the following steps (1) and (2):

(1) The first terminal sends a ticket purchase request to the server when detecting a ticket purchase instruction operation for the program on the information presentation page, and after receiving the ticket purchase request, the server allocates a virtual ticket of the program to the first user identifier and sends a ticket purchase success message to the first mobile terminal. The first terminal sends the sharing request to the server if a ticket purchase sharing operation on the information presentation page is detected after the ticket purchase success message returned by the server is received.

The ticket purchase instruction operation is used to trigger the first mobile terminal to perform a ticket purchase operation. The virtual ticket may be a ticket identifier, a two-dimensional code ticket, or the like. This is not limited in this embodiment of the present disclosure.

(2) The first terminal obtains, when detecting a comment instruction operation for the program on the information presentation page, comment information entered by the user, and sends a commenting request to the server. The commenting request carries at least the comment information. After receiving the commenting request, the server publishes the comment information on the information presentation page and sends a comment success message to the first mobile terminal. The first terminal sends the sharing request to the server if a comment sharing operation on the information presentation page is detected after the comment success message returned by the server is received. The comment instruction operation is used to trigger the first mobile terminal to perform a commenting operation.

In an actual application, a process of completing the designated operation and the sharing operation may be implemented based on an entry provided by the server. For example, the server may provide an entry of the designated operation on the information presentation page. The entry of the designated operation is used to trigger the designated operation. The first terminal can display the entry of the designated operation when displaying the information presentation page, and the user can trigger the entry of the designated operation to complete the designated operation. Further, the server may further provide a sharing entry on the information presentation page. The sharing entry is used to trigger the sharing operation. The first terminal can display the sharing entry when displaying the information presentation page, and the first mobile terminal can send the sharing request to the server when detecting an operation of triggering the sharing entry.

Alternatively, the server may provide the sharing entry for the first mobile terminal when determining that the first mobile terminal completes the designated operation. The sharing entry can be displayed on the information presentation page on when it is determined that the first mobile terminal completes the designated operation, and the first mobile terminal can send the sharing request to the server when detecting the operation of triggering the sharing entry.

The entry of the designated operation and the sharing entry may be displayed on the information presentation page in a form of icons, buttons, or the like. Correspondingly, the corresponding operations can be triggered by clicking the corresponding icons or buttons. This is not limited in this embodiment of the present disclosure.

Figure 6B:
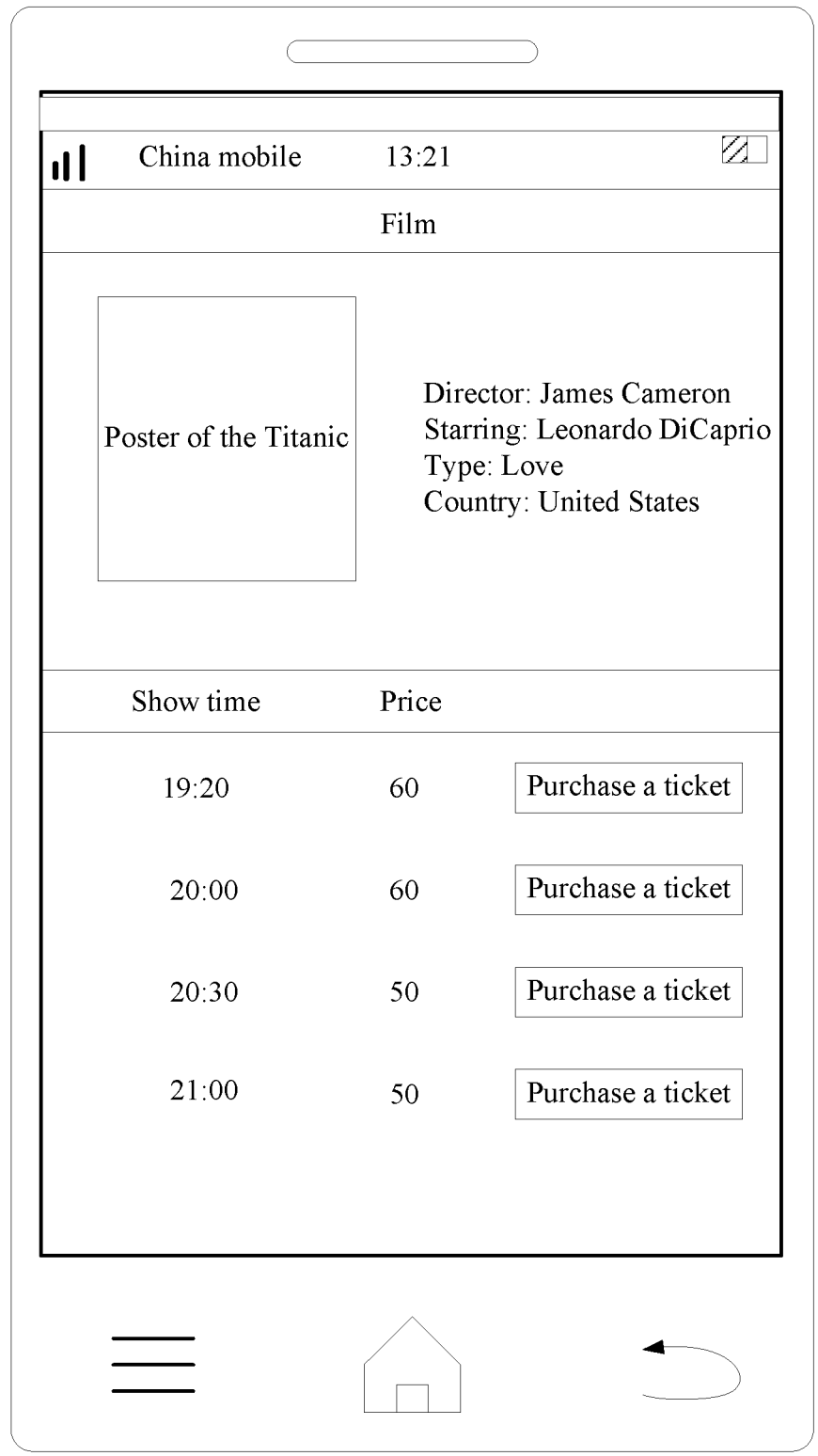
FIG. 6B is a schematic diagram of an information presentation page of a program according to an embodiment of the present disclosure.
Figure 6C:
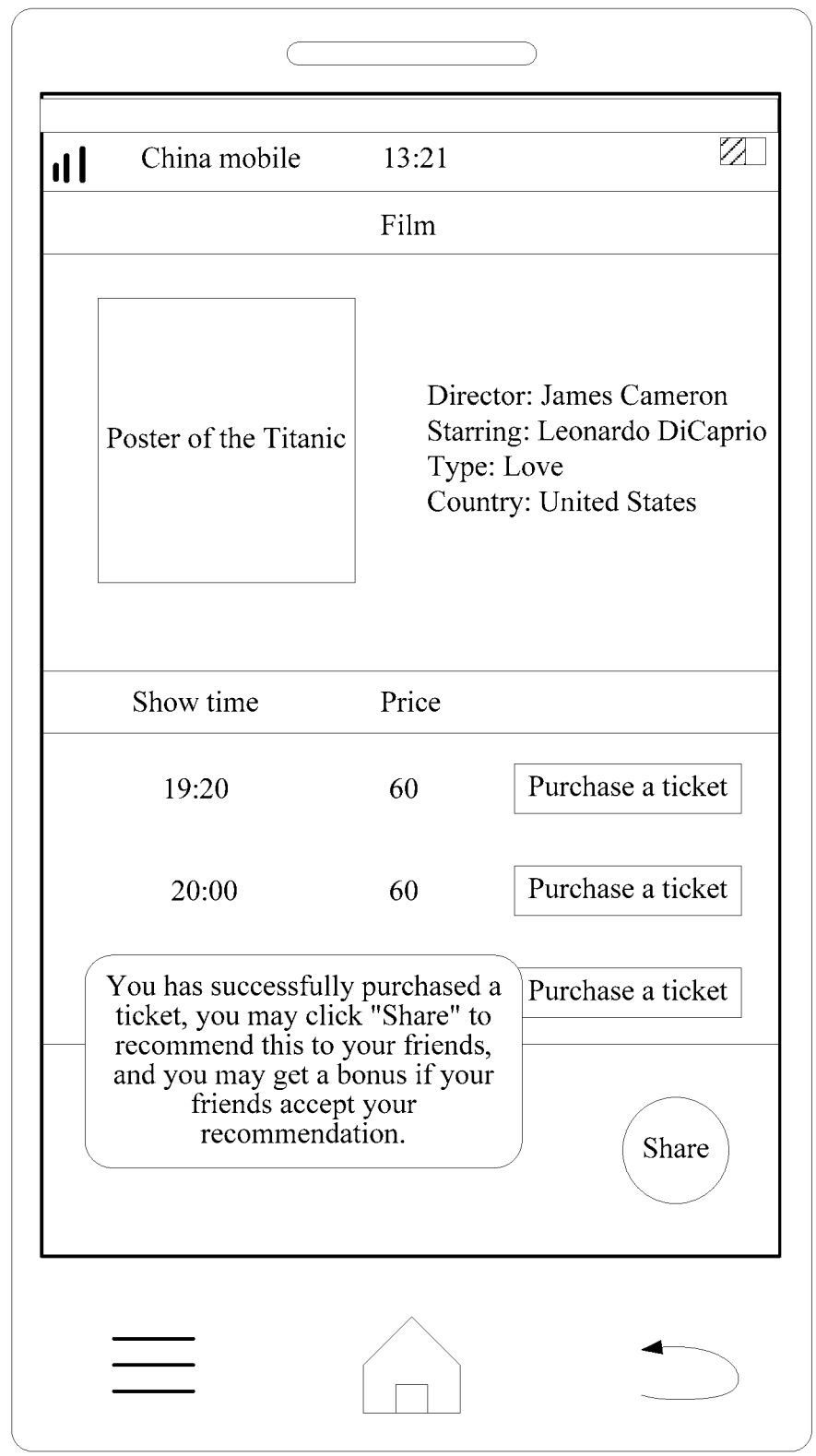
FIG. 6C is a schematic diagram of an information presentation page of a program according to an embodiment of the present disclosure.

For example, referring to FIG. 6B, the terminal displays an information presentation page of the film "the Titanic". The information presentation page includes detailed information such as film introduction, show time, and a ticket price. In addition, icons of "Purchase a ticket" are further displayed after different sessions of films. When a user clicks an icon of "Purchase a ticket", the user may enter a payment page to make a payment, so as to complete a ticket purchase operation. After the user successfully purchases a ticket, the terminal may display the information presentation page shown in FIG. 6C. The information presentation page may include an icon of "Share", and a sharing request can be sent to the server after the user clicks the icon of "Share".

In addition, the first mobile terminal may display the information presentation page after sending the sharing request to the server. Alternatively, if the first mobile terminal designates a receiver identifier before sending the sharing request to the server, the first mobile terminal may display a dialog window between the first user identifier and the receiver identifier after sending the sharing request to the server. Alternatively, if the first mobile terminal does not designate a receiver identifier before sending the sharing request to the server, but shares the information presentation page with all user identifiers in the user relation chain of the first user identifier, the first mobile terminal may display a message aggregation page, to view a sharing link shared with other users.

The message aggregation page is used to aggregate a message that is pushed by the server to the first mobile terminal according to the first user identifier, and the user can view, on the message aggregation page, a message published by another user. In addition, the first mobile terminal may further provide a message entry on the message aggregation page. When a user wants to view the message aggregation page, the user may activate the message entry, and the first mobile terminal displays the message aggregation page when detecting an activation operation on the message entry.

602. The server receives the sharing request sent by the first mobile terminal, and generates a sharing link according to a page link and a first user identifier.

After receiving the sharing request sent by the first mobile terminal, the server may generate, according to the page link linked to the information presentation page and the first user identifier that are carried in the sharing request, the sharing link used to be linked to the information presentation page, and the sharing link carries the first user identifier.

Specifically, the server merges the page link and the first user identifier, to obtain the sharing link. For example, the first user identifier is added after the page link and is used as a suffix of the page link, to obtain the sharing link.

The page link and the sharing link may be uniform resource locators (URL), or links in another form. This is not limited in this embodiment of the present disclosure. A difference between the page link and the sharing link lies in that the sharing link is generated under triggering of the first user identifier, and the sharing link carries the first user identifier.

603. The server sends, based on a user relation chain of the first user identifier, the sharing link to a second terminal of at least one second user identifier in the user relation chain.

The second user identifier may be all user identifiers included in the user relation chain of the first user identifier, for example, all friends of the user, or may be a receiver identifier that is designated by the first mobile terminal for the sharing link according to the user relation chain of the first mobile terminal. This is not limited in this embodiment of the present disclosure.

The process of sending the sharing link is different according to whether the user of the first mobile terminal designates a receiver identifier of the sharing link, and specifically, at least one of the following steps (1) and (2) may be included.

(1) When the first mobile terminal does not designate the receiver identifier, and shares the information presentation page with all user identifiers in the user relation chain of the first user identifier by default, after receiving the sharing request sent by the first mobile terminal, the server determines each second user identifier included in the user relation chain of the first user identifier, and sends the sharing link to a second terminal of each second user identifier.

(2) When the first mobile terminal designates the receiver identifier, after receiving the sharing request sent by the first mobile terminal, the server obtains the receiver identifier that is designated by the first mobile terminal for the sharing link according to the user relation chain of the first user identifier, uses the receiver identifier as the second user identifier, and sends the sharing link to a second terminal of the second user identifier.

In addition, if the user triggers the sharing operation after completing the designated operation, the sharing link may further include a designated operation message of the designated operation. The designated operation message is used to indicate the designated operation completed by the first mobile terminal, for example, a ticket purchase success message or a comment message. For example, after user A completes a ticket purchase operation on an information presentation page of the program and shares the program with user B, a terminal of user B may display a sharing link, and the sharing link may include a ticket purchase success message "Your friend A has successfully purchased one ticket of "the Titanic" whose show time is 19:20 on Jan. 20, 2016, you can click to purchase a ticket too".

604. The second terminal receives the sharing link sent by the server, displays the sharing link, and displays the information presentation page according to the sharing link when detecting a click operation on the sharing link.

The second terminal may display the sharing link after receiving the sharing link pushed by the server, and the sharing link may be linked to the information presentation page. The second terminal may skip to the information presentation page from a currently displayed page after detecting the click operation on the sharing link.

Specifically, the second mobile terminal may send an access request to the server when detecting the click operation on the sharing link, and the access request carries the sharing link. The server may identify, according to the sharing link after receiving the access request, the page link used to be linked to the information presentation page, read the information presentation page according to the page link, and send the information presentation page to the second mobile terminal. The second terminal can display the information presentation page. In this case, the server may determine that the second mobile terminal displays the information presentation page according to the sharing link.

For example, based on the example in step 603, when user B clicks the sharing link, the terminal may skip to the information presentation page of the film "the Titanic" from the currently displayed page, and user B can complete a ticket purchase operation on the information presentation page conveniently.

Manners in which the second mobile terminal displays the sharing link may be different according to whether the second user identifier of the second mobile terminal is the receiver identifier designated by the first mobile terminal, and at least one of the following steps (1) and (2) may be included.

(1) If the first mobile terminal does not designate the receiver identifier, and the user identifier of the second mobile terminal is a user identifier in the user relation chain of the first user identifier, the second mobile terminal displays the sharing link on a message aggregation page after receiving the sharing link sent by the server.

The message aggregation page is used to aggregate a message that is pushed by the server to the second mobile terminal according to the second user identifier, and the user can view, on the message aggregation page, a message published by another user. In addition, the second mobile terminal may further provide a message entry on the message aggregation page. When a user wants to view the message aggregation page, the user may activate the message entry, and the second mobile terminal may display the message aggregation page when detecting an activation operation on the message entry.

(2) If the first mobile terminal designates that the user identifier of the second mobile terminal is the receiver identifier, the second mobile terminal displays the sharing link on a message receiving page corresponding to the first user identifier after receiving the sharing link sent by the server.

The message receiving page corresponding to the first user identifier includes a message exchanged between the first user identifier and the second user identifier, for example, a message sent by the first user identifier to the second user identifier, or a message sent by the second user identifier to the first user identifier. The message receiving page may further include an input field, and the user of the second mobile terminal may enter, on the input field, a message to be sent to the first user identifier.

For example, the message receiving page may be a dialog window between the first user identifier and the second user identifier. After the second mobile terminal receives the sharing link sent by the server, if the user opens the dialog window, the second mobile terminal may display the dialog window, and display the sharing link on the dialog window.

In addition, the second mobile terminal may display message receiving pages corresponding to different user identifiers, to interact with different users.

605. The second terminal sends a designated operation request to the server if a designated instruction operation on the information presentation page is detected.

The designated instruction operation is used to trigger the second mobile terminal to perform the designated operation. When the designated instruction operation on the information presentation page is detected, the second mobile terminal can send the designated operation request to the server and complete the designated operation by using the server. The designated operation request carries the sharing link and the identifier of the second user currently logging on, and the second user identifier may be a user account, a user name, or the like of the second mobile terminal. This is not limited in this embodiment of the present disclosure.

In some embodiments, the designated instruction operation may be triggered via the entry of the designated operation on the information presentation page. For example, when the information presentation page is displayed according to the sharing link, the entry of the designated operation may further be displayed on the information presentation page, and the designated operation can be triggered when the operation of triggering the entry of the designated operation is detected.

Using an example in which the information presentation page is an information presentation page of a program, for different designated operations, designated operation requests sent to the server are different, and processes performed by the server after the server receives the designated operation requests are different. Specifically, at least one of the following steps (1) and (2) may be included.

(1) Send a ticket purchase request to the server if a ticket purchase instruction operation for the program on the information presentation page is detected, where the ticket purchase request carries the sharing link and the identifier of the second user currently logging on. After receiving the ticket purchase request, the server can allocate a virtual ticket of the program to the second user identifier, and determine that the second mobile terminal completes a ticket purchase operation for the program according to the sharing link.

(2) Obtain entered comment information if a comment instruction operation for the program on the information presentation page is detected, and send a commenting request to the server, where the commenting request carries at least the comment information and the identifier of the second user currently logging on. After receiving the commenting request, the server can publish the comment information on the information presentation page, and determine that the second mobile terminal completes a commenting operation on the program according to the sharing link.

606. Allocate virtual goods to the first user identifier in the sharing link according to a preset policy when it is determined that the second mobile terminal displays the information presentation page according to the sharing link and completes a designated operation on the information presentation page.

The preset policy is used to determine which virtual goods is allocated to the first user identifier, how much virtual goods is allocated to the first user identifier, and the like, and the preset policy may be set by the server by default, or may be set according to a grade of the first user identifier, or may be set according to a type of the designated operation completed by the second mobile terminal. This is not limited in this embodiment of the present disclosure.

When determining that the second mobile terminal displays the information presentation page according to the sharing link, and completes the designated operation on the information presentation page, the server may obtain the first user identifier carried in the sharing link, and allocate the virtual goods to the first user identifier according to the preset policy.

For example, the virtual goods may be allocated to the first user identifier according to the preset policy when it is determined that the information presentation page is displayed according to the sharing link, and the ticket purchase operation for the program is completed on the information presentation page. Alternatively, the virtual goods may be allocated to the first user identifier according to the preset policy when it is determined that the second mobile terminal displays the information presentation page according to the sharing link, and completes the commenting operation for the program on the information presentation page.

A manner of allocating the virtual goods to the first user identifier according to the preset policy may include at least one of the following operations: adding a numerical value to an account of the first user identifier; adding a virtual ticket to a virtual goods library of the first user identifier; adding a virtual red envelop to the virtual goods library of the first user identifier; and adding a virtual prop to the virtual goods library of the first user identifier. This is not limited in this embodiment of the present disclosure.

In addition, the server may further send an allocation notification to the first mobile terminal when allocating the virtual goods to the first user identifier, and notify the user of the first mobile terminal that the user has obtained the virtual goods. When the first mobile terminal detects a trigger operation for the allocation notification, the first mobile terminal may further display detailed information of the virtual goods, a second user identifier helping the first user identifier to obtain the virtual goods, a designated operation completed by the second user identifier, and the like. This is not limited in this embodiment of the present disclosure.

Further, when it is determined that the second mobile terminal completes the designated operation according to the sharing link, the second mobile terminal may further display a sharing prompt message on the information presentation page, and the sharing prompt message is used to prompt that the user can obtain the virtual goods via the sharing operation. For example, when it is determined that the second mobile terminal completes the ticket purchase operation, the second mobile terminal may display, on the information presentation page, the sharing prompt message "You has successfully purchased a ticket, you may click "Share" to recommend this to your friends, and you may get a bonus if your friends accept your recommendation." shown in FIG. 6C.

In this way, the sharing prompt message may be displayed after each user completes the designated operation on the information presentation page, to prompt that the user may obtain virtual goods via the sharing operation, so as to encourage the user to share the program.

It should be noted that this embodiment is merely described by using an example in which the virtual goods is allocated to the first user identifier only when it is determined that the second mobile terminal displays the information presentation page according to the sharing link and completes the designated operation on the information presentation page. In an actual application, the server may further allocate the virtual goods to the first user identifier only when the second mobile terminal displays the information presentation page according to the sharing link, and the user does not need to complete the designated operation on the information presentation page. That is, when the server returns the information presentation page to the second mobile terminal according to an access request of the second mobile terminal, the server can allocate the virtual goods to the first user identifier.

Correspondingly, the sharing prompt message may further be displayed on the information presentation page when the second mobile terminal displays the information presentation page but does not complete the designated operation on the information presentation page. That is, the displayed information presentation page may include the sharing prompt message when the second mobile terminal displays the information presentation page according to the sharing link. This is not limited in this embodiment of the present disclosure.

In the method provided in this embodiment of the present disclosure, when the user successfully purchases a ticket or when the user makes a comment after watching the program, the user can conveniently share the program with a friend by sending a sharing link, and the friend of the user can purchase a ticket only by clicking the sharing link, but does not need to search a program-related ticket website for the program shared by the user, thereby simplifying operations of the user and the friend of the user, improving interactivity between users, and increasing the recommendation conversion rate. In addition, after the friend of the user accepts the sharing of the user, the user sending the sharing link can obtain the virtual goods. In this way, the sharing initiative of the user can be improved greatly, the user can be encouraged to make sharing, and transmission of the program in the user relation chain can be promoted.

To sum up, in the method provided in this embodiment of the present disclosure, the sharing link carrying the page link of the information presentation page and the first user identifier is generated according to the sharing request sent by the first mobile terminal, and is sent to the second mobile terminal of the at least one second user identifier in the user relation chain of the first user identifier, and the virtual goods is allocated to the first user identifier when it is determined that the second mobile terminal displays the information presentation page according to the sharing link. A user can share an information presentation page with another user by sending a sharing link, and virtual goods can be allocated to the user when the another user accepts sharing of the user. Therefore, operation is convenient, interactivity is enhanced, and user viscosity is improved. The another user can view the information presentation page only by clicking the sharing link, so that the operation is relatively convenient, and the recommendation conversion rate is increased.

Figure 7:
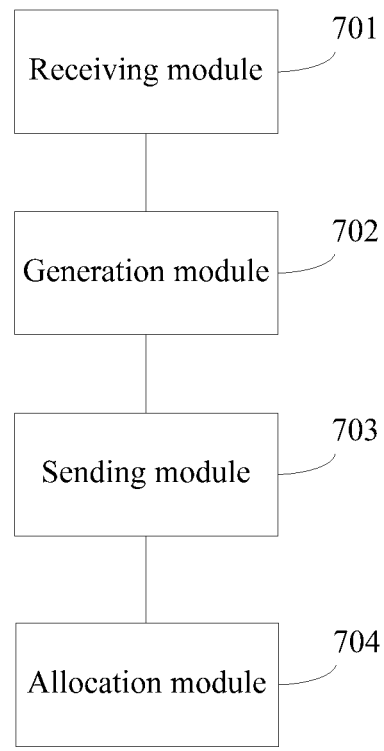
FIG. 7 is a schematic structural diagram of an information processing apparatus according to an embodiment of the present disclosure.

FIG. 7 is a schematic structural diagram of an information processing apparatus according to an embodiment of the present disclosure. The apparatus may be a server. Referring to FIG. 7, the apparatus includes:

a receiving module 701, configured to receive a sharing request sent by a first terminal, the sharing request carrying at least a page link used to be linked to an information presentation page and an identifier of a first user currently logging on, and the sharing request being generated under triggering by the first mobile terminal when the first mobile terminal detects a sharing operation on the information presentation page;

a generation module 702, configured to generate a sharing link according to the page link and the first user identifier, the sharing link being used to be linked to the information presentation page;

a sending module 703, configured to send, based on a user relation chain of the first user identifier, the sharing link to a second terminal of at least one second user identifier in the user relation chain; and an allocation module 704, configured to allocate virtual goods to the first user identifier in the sharing link according to a preset policy when it is determined that any second terminal displays the information presentation page according to the sharing link.

The apparatus provided in this embodiment of the present disclosure generates the sharing link carrying the page link of the information presentation page and the first user identifier according to the sharing request sent by the first mobile terminal, sends the sharing link to the second mobile terminal of the at least one second user identifier in the user relation chain of the first user identifier, and allocates the virtual goods to the first user identifier when it is determined that any second terminal displays the information presentation page according to the sharing link. A user can share an information presentation page with another user by sending a sharing link, and virtual goods can be allocated to the user when the another user accepts sharing of the user. Therefore, operation is convenient, interactivity is enhanced, and user viscosity is improved. The another user can view the information presentation page only by clicking the sharing link, so that the operation is relatively convenient, and the recommendation conversion rate is increased.

In some embodiments, the allocation module 704 is further configured to allocate the virtual goods to the first user identifier in the sharing link according to the preset policy when it is determined that any second terminal displays the information presentation page according to the sharing link and completes a designated operation on the information presentation page.

In some embodiments, the designated operation includes at least one of a ticket purchase operation and a commenting operation.

In some embodiments, the information presentation page is an information presentation page of a program, and the apparatus further includes a responding module, where the responding module is configured to allocate, when a ticket purchase request sent by any second terminal is received and the ticket purchase request carries the sharing link and a second user identifier corresponding to the second mobile terminal, a virtual ticket of the program to the second user identifier corresponding to the second mobile terminal, and determine that the second mobile terminal completes a ticket purchase operation for the program according to the sharing link; or the responding module is configured to publish, when a commenting request sent by any second terminal is received and the commenting request carries the sharing link, a second user identifier corresponding to the second mobile terminal, and to-be-published comment information, the comment information on the information presentation page, and determine that the second mobile terminal completes a commenting operation for the program according to the sharing link.

In some embodiments, the allocation module 704 is further configured to perform at least one of the following operations: adding a numerical value to an account of the first user identifier;

adding a virtual ticket to a virtual goods library of the first user identifier;

adding a virtual red envelop to the virtual goods library of the first user identifier; and adding a virtual prop to the virtual goods library of the first user identifier.

In some embodiments, the apparatus further includes an entry providing module. The entry providing module may be configured to provide an entry of the designated operation on the information presentation page, so that the first mobile terminal completes the designated operation according to the entry of the designated operation when displaying the information presentation page; and provide a sharing entry when it is determined that the first mobile terminal completes the designated operation, where the sharing entry is used to trigger the sharing operation.

In some embodiments, the receiving module 701 is further configured to receive an access request sent by any second terminal, where the access request carries the sharing link; and the sending module 703 is further configured to identify the page link according to the sharing link, and send the information presentation page to the second mobile terminal according to the page link, so that the second mobile terminal displays the information presentation page.

In some embodiments, the sending module 703 is further configured to determine each second user identifier included in the user relation chain of the first user identifier; and send the sharing link to a second terminal of each second user identifier, so that the second mobile terminal of each second user identifier displays the sharing link on a message aggregation page.

In some embodiments, the sending module 703 is further configured to obtain a receiver identifier that is designated by the first mobile terminal for the sharing link according to the user relation chain of the first user identifier, use the receiver identifier as the second user identifier, and send the sharing link to a second terminal of the second user identifier, so that the second mobile terminal displays the sharing link on a message receiving page.

All exemplary technical solutions above may be combined in any manner to form exemplary embodiments of the present disclosure. Details are not described herein.

Figure 8:
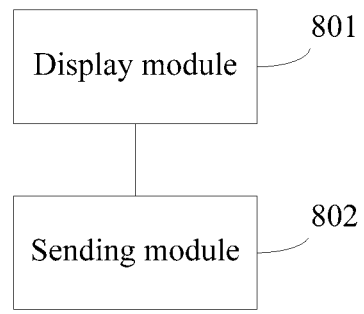
FIG. 8 is a schematic structural diagram of an information processing apparatus according to an embodiment of the present disclosure.

FIG. 8 is a schematic structural diagram of an information processing apparatus according to an embodiment of the present disclosure. The apparatus may be a terminal. Referring to FIG. 8, the apparatus includes:

a display module 801, configured to display an information presentation page; and a sending module 802, configured to send a sharing request to a server if a sharing operation on the information presentation page is detected, the sharing request carrying at least a page link used to be linked to the information presentation page and an identifier of a first user currently logging on.

The server is configured to generate, according to the page link and the first user identifier, a sharing link used to be linked to the information presentation page, send, based on a user relation chain of the first user identifier, the sharing link to a second terminal of at least one second user identifier in the user relation chain, and allocate virtual goods to the first user identifier in the sharing link according to a preset policy when it is determined that any second terminal displays the information presentation page according to the sharing link.

The apparatus provided in this embodiment of the present disclosure sends the sharing request to the server according to the detected sharing operation when the information presentation page is displayed, so that the server generates the sharing link carrying the page link of the information presentation page and the first user identifier, sends the sharing link to the second mobile terminal of the at least one second user identifier in the user relation chain of the first user identifier, and allocates the virtual goods to the first user identifier when it is determined that any second terminal displays the information presentation page according to the sharing link. A user can share an information presentation page with another user by sending a sharing link, and virtual goods can be allocated to the user when the another user accepts sharing of the user. Therefore, operation is convenient, interactivity is enhanced, and user viscosity is improved. The another user can view the information presentation page only by clicking the sharing link, so that the operation is relatively convenient, and the recommendation conversion rate is increased.

In some embodiments, the sending module 802 is further configured to send the sharing request to the server if the sharing operation is detected after a designated operation is completed on the information presentation page.

In some embodiments, the designated operation includes at least one of a ticket purchase operation and a commenting operation.

In some embodiments, the information presentation page is an information presentation page of a program;

the sending module 802 is further configured to send a ticket purchase request to the server when a ticket purchase instruction operation for the program on the information presentation page is detected, so that the server allocates a virtual ticket of the program to the first user identifier; and the sending module 802 is further configured to send the sharing request to the server if the sharing operation on the information presentation page is detected after a ticket purchase success message returned by the server is received.

In some embodiments, the information presentation page is an information presentation page of a program;

the sending module 802 is further configured to obtain entered comment information when a comment instruction operation for the program on the information presentation page is detected, and send a commenting request to the server, where the commenting request carries at least the comment information, so that the server publishes the comment information on the information presentation page; and the sending module 802 is further configured to send the sharing request to the server if the sharing operation on the information presentation page is detected after a comment success message returned by the server is received.

In some embodiments, the display module 801 is further configured to display an entry of the designated operation on the information presentation page when the information presentation page is displayed, where the entry of the designated operation is used to trigger the designated operation; and the display module 801 is further configured to display, on the information presentation page after the designated operation is completed according to the entry of the designated operation, a sharing entry provided by the server, where the sharing entry is used to trigger the sharing operation.

In some embodiments, the apparatus further includes:

an obtaining module, configured to obtain a designated receiver identifier from the user relation chain of the first user identifier, where correspondingly, the sharing request further carries the receiver identifier.

In some embodiments, the display module 801 is further configured to display a message aggregation page after the sharing request is sent to the server; or the display module 801 is further configured to display a message aggregation page when an activation operation on a message entry is detected, where the message aggregation page is used to aggregate a message that is pushed by the server to the first mobile terminal according to the first user identifier.

All exemplary technical solutions above may be combined in any manner to form exemplary embodiments of the present disclosure. Details are not described herein.

Figure 9:
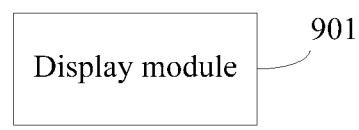
FIG. 9 is a schematic structural diagram of an information processing apparatus according to an embodiment of the present disclosure.

FIG. 9 is a schematic structural diagram of an information processing apparatus according to an embodiment of the present disclosure. The apparatus may be a terminal. Referring to FIG. 9, the apparatus includes:

a display module 901, configured to display a sharing link used to be linked to an information presentation page, the sharing link being generated by a server, after the server receives a sharing request that is generated by a first terminal when the first mobile terminal detects a sharing operation on the information presentation page, according to a page link used to be linked to the information presentation page and an identifier of a first user currently logging onto the first mobile terminal, where the display module 901 is further configured to display the information presentation page according to the sharing link when a click operation on the sharing link is detected, so that the server displays the information presentation page according to the sharing link, and allocates virtual goods to the first user identifier in the sharing link according to a preset policy.

The apparatus provided in this embodiment of the present disclosure displays the sharing link used to be linked to the information presentation page, and allocates the virtual goods to the first user identifier in the sharing link when it is determined that the information presentation page is displayed according to the sharing link. A sharing link shared by another user is displayed, so that it can be ensured that the information presentation page can be displayed only by clicking the sharing link by the user. Therefore, the operation is convenient, and the recommendation conversion rate is increased. In addition, when the user displays the information presentation page according to the sharing link, virtual goods is allocated to the user sending the sharing link, so that interactivity is enhanced, and user viscosity is improved.

In some embodiments, the apparatus further includes:

a sending module, configured to send a designated operation request to the server if a designated instruction operation on the information presentation page is detected, where the designated operation request carries the sharing link and an identifier of a second user currently logging on, so that the server displays the information presentation page according to the sharing link, and allocates the virtual goods to the first user identifier in the sharing link according to the preset policy when a designated operation is completed on the information presentation page.

In some embodiments, the information presentation page is an information presentation page of a program;

the sending module is further configured to send a ticket purchase request to the server if a ticket purchase instruction operation for the program on the information presentation page is detected, where the ticket purchase request carries the sharing link and the second user identifier, so that the server allocates a virtual ticket of the program to the second user identifier, displays the information presentation page according to the sharing link, completes a ticket purchase operation for the program on the information presentation page, and allocates the virtual goods to the first user identifier according to the preset policy.

In some embodiments, the information presentation page is an information presentation page of a program;

the sending module is further configured to obtain entered comment information if a comment instruction operation for the program on the information presentation page is detected, and send a commenting request to the server, where the commenting request carries at least the comment information and the identifier of the second user currently logging on, so that the server publishes the comment information on the information presentation page, and allocates the virtual goods to the first user identifier according to the preset policy when it is determined that the information presentation page is displayed according to the sharing link and a commenting operation for the program is completed on the information presentation page.

In some embodiments, the sending module is further configured to send an access request to the server when a click operation on the sharing link is detected, where the access request carries the sharing link, so that the server identifies the page link according to the sharing link, and returns the information presentation page according to the page link; and the display module is further configured to display the information presentation page returned by the server.

In some embodiments, the display module 901 is further configured to display an entry of the designated operation on the information presentation page when the information presentation page is displayed according to the sharing link, where the entry of the designated operation is used to trigger the designated operation.

In some embodiments, the display module 901 is further configured to aggregate, on a message aggregation page, a message pushed by the server; and when an activation operation on a message entry is detected, display the message aggregation page, and display the sharing link on the message aggregation page.

In some embodiments, the display module 901 is further configured to display the sharing link on a message receiving page corresponding to the first user identifier.

All exemplary technical solutions above may be combined in any manner to form exemplary embodiments of the present disclosure. Details are not described herein.

It should be noted that the information processing apparatus provided in the embodiments are merely described by using division of the functional modules an example during program-based interaction. In an actual application, the foregoing functions may be allocated to different functional modules for completion according to requirements. That is, the internal structures of the server and the terminal are divided into different functional modules, to complete all or a part of functions described above. In addition, the information processing apparatus and the information processing method that are provided in the foregoing embodiments belong to a same idea. For a specific implementation process, refer to the method embodiment, and details are not described herein again.

Figure 10:
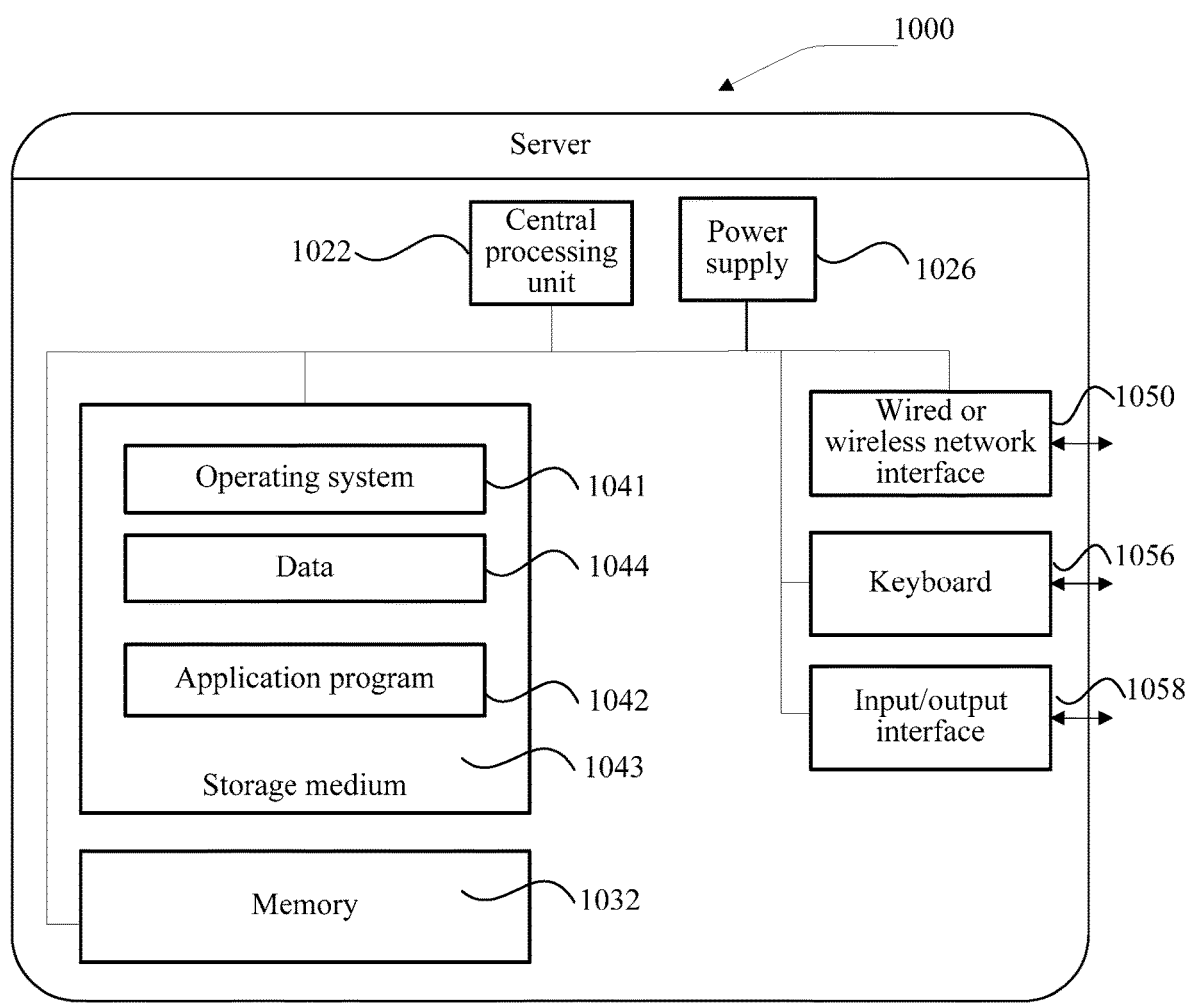
FIG. 10 is a schematic structural diagram of a server according to an embodiment of the present disclosure.

FIG. 10 is a schematic structural diagram of a server according to an embodiment of the present disclosure. The server 1000 may be configured to implement functions performed by the server in the information processing method shown in the foregoing embodiments, may vary greatly due to different configurations and performance, and may include one or more central processing units (CPU) 1022 (for example, one or more processors) and a memory 1032, and one or more storage mediums 1043 (for example, one or more massive storage devices) storing an application 1042 or data 1044.

The memory 1032 and the storage medium 1043 may be transient or persistent storages. The program stored in the storage medium 1043 may include one or more modules (not shown in the figure), and each module may include a series of instruction operations in the server. In general, the memory 1032 and the storage medium 1043 correspond to a non-transitory computer readable storage medium including volatile and non-volatile media, and removable and non-removable media implemented by using any method or technology used for storing information such as a computer readable instruction, a data structure, a program module or other data. The computer readable storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices.

Still further, the CPU 1022 may be configured to communicate with the storage medium 1043, and perform the series of instruction operations in the storage medium 1043 on the server 1000, to perform the functions performed by the server in the information processing method in the foregoing embodiment.

The server 1000 may further include one or more power supplies 1026, one or more wired or wireless network interfaces 1050, one or more input/output interfaces 1058, one or more keyboards 1056, and/or one or more operating systems 1041, such as Windows Server™, Mac OS X™, Unix™, Linux™, and FreeBSD™.

Figure 11:
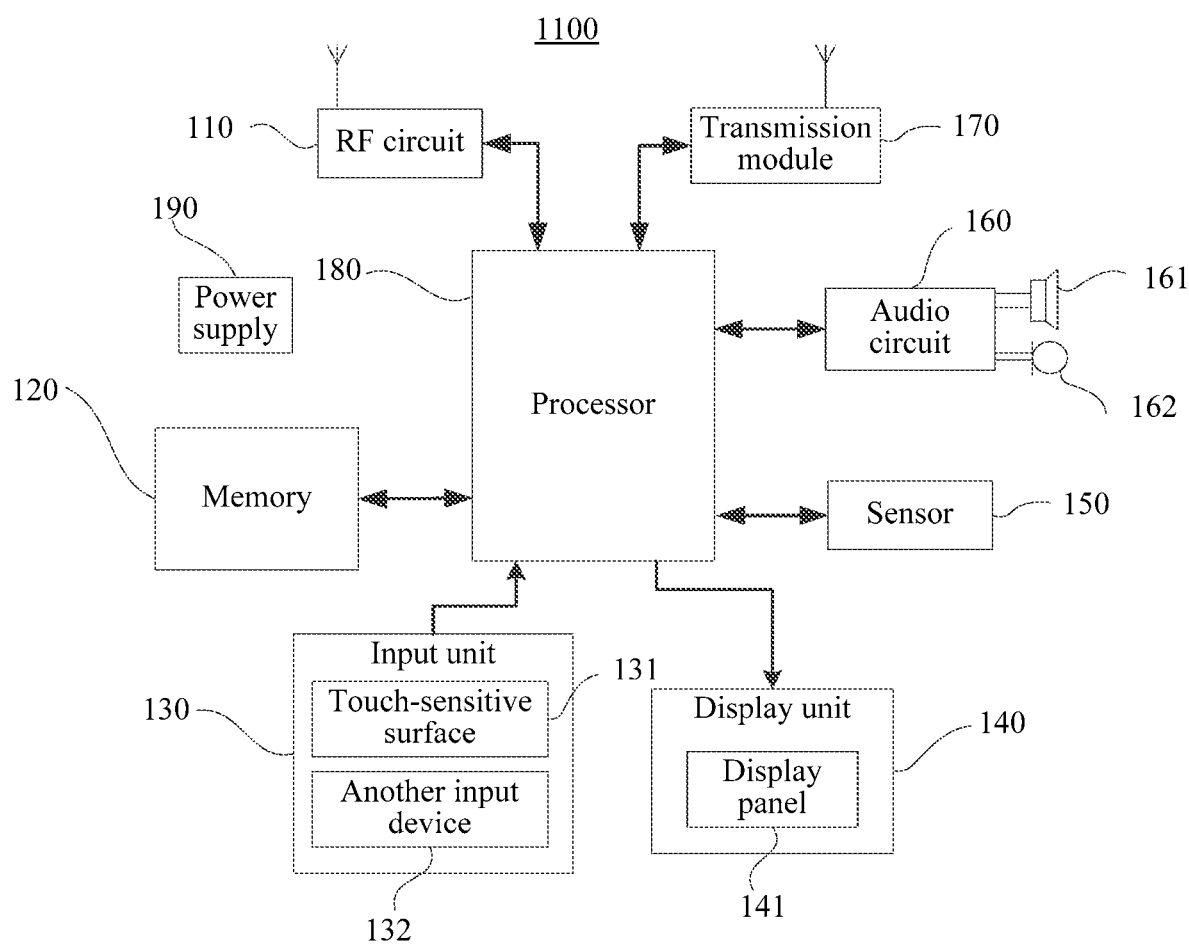
FIG. 11 is a schematic structural diagram of a terminal according to an embodiment of the present disclosure.

FIG. 11 is a schematic structural diagram of a terminal according to an embodiment of the present disclosure. The terminal may be configured to implement functions performed by the first mobile terminal and the second mobile terminal in the information processing method in the foregoing embodiments.

The terminal 1100 may include a radio frequency (RF) circuit 110, a memory 120 including one or more computer readable storage mediums, an input unit 130, a display unit 140, a sensor 150, an audio circuit 160, a transmission module 170, a processor 180 including one or more processing cores, a power supply 190, and the like. A person skilled in the art may understand that the structure of the terminal shown in FIG. 11 does not constitute a limitation to the terminal, and the terminal may include more or fewer components than those shown in the figure, or some components may be combined, or a different component deployment may be used.

The RF circuit 110 may be configured to receive and send signals during an information receiving and sending process or a call process. Particularly, the RF circuit receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may further communicate with a network and another terminal by means of wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, and Short Messaging Service (SMS).

The memory 120 may be configured to store a software program and a module, for example, a software program and a module corresponding to the terminal shown in the foregoing embodiment. The processor 180 performs various function application and data processing by running the software program and the module stored in the memory 120, for example, implements vide-based interaction. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1100, and the like.

In addition, the memory 120 may include a high-speed random access memory, or may include a non-volatile memory, for example, at least one magnetic storage component, a flash component, or another volatile storage component. Correspondingly, the memory 120 may further include a memory controller, so that the processor 180 and the input unit 130 access the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input terminal 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. In some embodiments, the touch-sensitive surface 131 may include a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent by the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 1100. The display unit 140 may include a display panel 141, and In some embodiments, the display panel 141 may be configured in a form of a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of the touch event. Then, the processor 180 provides a corresponding visual output on the display panel 141 according to the type of the touch event. Although, in FIG. 11, the touch-sensitive surface 131 and the display panel 141 are used as two separate parts to implement input and output functions, in some embodiments, the touch-sensitive surface 131 and the display panel 141 may be integrated to implement the input and output functions.

The terminal 1100 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1100 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1100, are not further described herein.

The audio circuit 160, a loudspeaker 161, and a microphone 162 may provide audio interfaces between the user and the terminal 1100. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1100.

The terminal 1100 may help, by using the transmission module 170, the user to receive and send e-mails, browse a webpage, access streaming media, and on the like, which provides wireless or wired broadband Internet access for the user. Although FIG. 11 shows the transmission module 170, it may be understood that the transmission module is not a necessary component of the terminal 1100, and when required, the transmission module may be omitted as long as the scope of the essence of the present disclosure is not changed.

The processor 180 is a control center of the terminal 1100, is connected to various parts of the entire mobile phone by using various interfaces and lines, and performs various functions of the terminal 1100 and process data by running or executing a software program and/or module stored in the memory 120 and invoking the data stored in the memory 120, so as to perform overall monitoring on the mobile phone. In some embodiments, the processor 180 may include one or more processing cores, and preferably, the processor 180 may integrate an application processor and a modem processor. The application processor mainly processes an operating system, a user interface, an application program, and the like, and the modem processor mainly processes wireless communication. It may be understood that the foregoing modem processor may also not be integrated into the processor 180.

The terminal 1100 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power fault detection circuit, a power supply converter or inverter, a power supply state indicator, and any other components.

Although not shown in the figure, the terminal 1100 may further include a camera, a Bluetooth module, and the like, and details are not described herein. Specifically, in this embodiment, the display unit of the terminal is a touch screen display, and the terminal further includes a memory and one or more programs. The one or more programs are stored in the memory and configured to be executed by one or more processors. The one or more programs include instructions used to implement the operations performed by the first mobile terminal and/or the second mobile terminal in the foregoing embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An information processing method performed by a server supporting a social application, the server having one or more processors and memory storing instructions to be executed by the one or more processors that is communicatively connected to a plurality of mobile terminals, the method comprising:
    receiving a sharing request sent by a first mobile terminal of the plurality of mobile terminals, the sharing request carrying at least a page link used to be linked to an event including a time of the event, wherein the event is associated with a venue, a first user currently logged into the social application at the first mobile terminal has purchased a ticket to the event, and the sharing request being generated under triggering by the first mobile terminal after the first mobile terminal detects a sharing operation on the event;
    generating a sharing link according to the page link and a first user identifier of the first user, the sharing link being used to be linked to the event;
    sending, based on a user relation chain of the first user identifier of the social application, the sharing link to at least a second mobile terminal of the plurality of mobile terminals of a second user identifier of the social application in the user relation chain, wherein the user relation chain of the first user identifier comprises each friend of the first user identifier;
    receiving a commenting request by the second mobile terminal on the event linked by the sharing link, the commenting request carrying the sharing link, the second user identifier, and commenting information about the event;
    publishing on the event linked by the sharing link, the commenting information;
    sending a comment success message to the second mobile terminal and displaying, at the second mobile terminal, the event including the time of the event, via the sharing link;
    receiving an indication that the second mobile terminal accepts a recommendation from the first user identifier; and
    allocating virtual goods, by the server, to the first user identifier in the sharing link according to a preset policy, wherein the virtual goods comprise a bonus offered after the second mobile terminal accepts the recommendation from the first user identifier, wherein allocating the virtual goods by the server comprises:
        adding a virtual red envelope from the server to a virtual goods library of the first user identifier.

2. The method according to claim 1, wherein the virtual goods are allocated to the first user identifier in the sharing link according to the preset policy, after the second mobile terminal displays the event according to the sharing link and completes a designated operation on the event, and
    wherein the designated operation comprises a shopping operation.

3. The method according to claim 2, wherein the event is a program, and
    wherein, before the allocating of the virtual goods, the method further comprises:
    allocating, when a ticket purchase request sent by the second mobile terminal is received and the ticket purchase request carries the sharing link and the second user identifier corresponding to the second mobile terminal, a virtual ticket of the program to the second user identifier corresponding to the second mobile terminal, and determining that the second mobile terminal completes the ticket purchase operation for the program according to the sharing link.

4. The method according to claim 2, wherein before the receiving of the sharing request sent by the first mobile terminal, the method further comprises:
    providing an entry of the designated operation on the event, so that the first mobile terminal completes the designated operation according to the entry of the designated operation when the first mobile terminal displays the event; and
    providing a sharing entry for the first mobile terminal when it is determined that the first mobile terminal completes the designated operation, wherein the sharing entry is used to trigger the sharing operation.

5. The method according to claim 1, further comprising:
    receiving an access request sent by the second mobile terminal, wherein the access request carries the sharing link; and
    identifying the page link according to the sharing link, and sending the event to the second mobile terminal according to the page link, so that the second mobile terminal displays the event.

6. The method according to claim 1, wherein the sending of the sharing link to the second mobile terminal comprises:
    determining the second user identifier included in the user relation chain of the first user identifier; and
    sending the sharing link to the second mobile terminal of the second user identifier, so that the second mobile terminal of the second user identifier displays the sharing link on a message aggregation page.

7. The method according to claim 1, wherein the sending of the sharing link to the second mobile terminal comprises:
    obtaining a receiver identifier that is designated by the first mobile terminal for the sharing link according to the user relation chain of the first user identifier, and using the receiver identifier as the second user identifier; and
    sending the sharing link to the second mobile terminal of the second user identifier, so that the second mobile terminal displays the sharing link on a message receiving page.

8. A computer server supporting a social application that is communicatively connected to a plurality of mobile terminals, comprising:
    one or more processors;
    memory coupled to the one or more processors; and a plurality of instructions stored in the memory that, when executed by the one or more processors, cause the computer server to perform the following operations:

receiving a sharing request sent by a first mobile terminal of the plurality of mobile terminals, the sharing request carrying at least a page link used to be linked to an event including a time of the event, wherein the event is associated with a venue, a first user currently logged into the social application at the first mobile terminal has purchased a ticket to the event, and the sharing request being generated under triggering by the first mobile terminal after the first mobile terminal detects a sharing operation on the event;

generating a sharing link according to the page link and a first user identifier of the first user, the sharing link being used to be linked to the event;

sending, based on a user relation chain of the first user identifier of the social application, the sharing link to at least a second mobile terminal of the plurality of mobile terminals of a second user identifier of the social application in the user relation chain, wherein the user relation chain of the first user identifier comprises each friend of the first user identifier;

receiving a commenting request by the second mobile terminal on the event linked by the sharing link, the commenting request carrying the sharing link, the second user identifier, and commenting information about the event;

publishing on the event linked by the sharing link, the commenting information;

sending a comment success message to the second mobile terminal and displaying, at the second mobile terminal, the event including the time of the event, via the sharing link;

receiving an indication that the second mobile terminal accepts a recommendation from the first user identifier; and allocating virtual goods, by the server, to the first user identifier in the sharing link according to a preset policy, wherein the virtual goods comprise a bonus offered after the second mobile terminal accepts the recommendation from the first user identifier, wherein allocating the virtual goods by the server comprises: adding a virtual red envelope from the server to a virtual goods library of the first user identifier.

9. The computer server according to claim 8, wherein the virtual goods are allocated to the first user identifier in the sharing link according to the preset policy, after the second mobile terminal displays the event according to the sharing link and completes a designated operation on the event, and wherein the designated operation comprises a shopping operation.

10. The computer server according to claim 9, wherein the event is a program, and wherein, before allocating the virtual goods, the computer server further performs:
allocating, when a ticket purchase request sent by the second mobile terminal is received and the ticket purchase request carries the sharing link and the second user identifier corresponding to the second mobile terminal, a virtual ticket of the program to the second user identifier corresponding to the second mobile terminal, and determining that the second mobile terminal completes the ticket purchase operation for the program according to the sharing link.

11. The computer server according to claim 9, wherein before receiving the sharing request sent by the first mobile terminal, the computer server further performs:

providing an entry of the designated operation on the event, so that the first mobile terminal completes the designated operation according to the entry of the designated operation when the first mobile terminal displays the event; and providing a sharing entry for the first mobile terminal when it is determined that the first mobile terminal completes the designated operation, wherein the sharing entry is used to trigger the sharing operation.

12. The computer server according to claim 8, further performs:

receiving an access request sent by the second mobile terminal, wherein the access request carries the sharing link; and identifying the page link according to the sharing link, and sending the event to the second mobile terminal according to the page link, so that the second mobile terminal displays the event.

13. The computer server according to claim 8, wherein the sending of the sharing link to the second mobile terminal comprises:

determining the second user identifier included in the user relation chain of the first user identifier; and sending the sharing link to the second mobile terminal of the second user identifier, so that the second mobile terminal of the second user identifier displays the sharing link on a message aggregation page.

14. The computer server according to claim 8, wherein the sending of the sharing link to the second mobile terminal comprises:

obtaining a receiver identifier that is designated by the first mobile terminal for the sharing link according to the user relation chain of the first user identifier, and using the receiver identifier as the second user identifier; and sending the sharing link to the second mobile terminal of the second user identifier, so that the second mobile terminal displays the sharing link on a message receiving page.

15. A non-transitory computer readable storage medium storing a plurality of instructions configured for execution by one or more processors of a computer server supporting a social application, the plurality of instructions, when executed by the one or more processors, causing the computer server to perform the following operations:

receiving a sharing request sent by a first mobile terminal of the plurality of mobile terminals, the sharing request carrying at least a page link used to be linked to an event including a time of the event, wherein the event is associated with a venue, a first user currently logged into the social application of the first mobile terminal has purchased a ticket to the event, and the sharing request being generated under triggering by the first mobile terminal after the first mobile terminal detects a sharing operation on the event;

generating a sharing link according to the page link and a first user identifier of the first user, the sharing link being used to be linked to the event;

sending, based on a user relation chain of the first user identifier of the social application, the sharing link to at least a second mobile terminal of the plurality of mobile terminals of a second user identifier of the social application in the user relation chain, wherein the user relation chain of the first user identifier comprises each friend of the first user identifier; and receiving a commenting request by the second mobile terminal on the event linked by the sharing link, the commenting request carrying the sharing link, the second user identifier, and commenting information about the event;

publishing on the event linked by the sharing link, the commenting information;

sending a comment success message to the second mobile terminal and displaying, at the second mobile terminal, the event including the time of the event, via the sharing link;

receiving an indication that the second mobile terminal accepts a recommendation from the first user identifier; and allocating virtual goods, by the server, to the first user identifier in the sharing link according to a preset policy, wherein the virtual goods comprise a bonus offered after the second mobile terminal accepts the recommendation from the first user identifier, wherein allocating the virtual goods by the server comprises: adding a virtual red envelope from the server to a virtual goods library of the first user identifier.

16. The non-transitory computer readable storage medium according to claim 15,
wherein the virtual goods are allocated to the first user identifier in the sharing link according to the preset policy, after the second mobile terminal displays the event according to the sharing link and completes a designated operation on the event, and
wherein the designated operation comprises at least one of a ticket purchase operation and a commenting operation.

17. The non-transitory computer readable storage medium according to claim 16,
wherein the event is a program, and
wherein, before the allocating of the virtual goods,
allocating, when a ticket purchase request sent by the second mobile terminal is received and the ticket purchase request carries the sharing link and the second user identifier corresponding to the second mobile terminal, a virtual ticket of the program to the second user identifier corresponding to the second mobile terminal, and determining that the second mobile terminal completes the ticket purchase operation for the program according to the sharing link.

* * * * *